Patented Apr. 24, 1951

2,549,913

UNITED STATES PATENT OFFICE 2,549,913

COPOLYMER OF ACRYLONITRILE AND ISOBUTENE AND METHOD FOR ITS PRODUCTION

Marion R. Lytton, West Chester, Pa., assignor to American Viscose Corporation, Wilmington, Del., a corporation of Delaware No Drawing. Application July 10, 1948, Serial No. 38,170

3 Claims. (Cl. 260—85.5)

This invention relates to a special copolymer of acrylonitrile and isobutene.

The advantageous characteristics of polyacrylonitrile for the production of strong, tough synthetic fibers and other structures has been recognized. However, practical use of the homopolymer has been hampered by its complete insolubility in most available organic solvents, and in order to adapt the homopolymer to practical use in the production of synthetic fibers and films, certain special solvents which have to be prepared by rather complicated and expensive procedures have been developed.

Copolymers of acrylonitrile with other polymerizable organic substances are known, and it has been recognized that such copolymers have an advantage over polyacrylonitrile in that, under certain conditions, they may be more readily dissolved in available solvents. Heretofore, however, it has been considered that in order for the copolymer to be soluble in comparatively inexpensive and generally available solvents at room temperature to produce solutions which can be stored at room temperature without excessive gelation, the percentage of the modifying component, that is the component other than acrylonitrile in the copolymer molecule had to be comparatively high, and so high that the properties of the copolymer, as for instance, toughness, tenacity, etc., did not compare favorably with the corresponding properties of polyacrylonitrile per se.

I have now found that a special copolymer of acrylonitrile and isobutene containing 90±0.5 mol per cent acrylonitrile and 10±0.5 mol per cent isobutene in the molecule has the outstanding advantage of solubility in binary mixtures of nitromethane with formamide, at room temperature, to produce clear homogeneous solutions which are indefinitely stable during storage under ordinary temperature conditions, and at the same time the copolymer has toughness, tenacity, and other physical properties which are practically identical with the properties of polyacrylonitrile so that articles, for example, synthetic fibers and yarns, of the copolymer have the same desirable characteristics as similar articles comprising the homopolymer. In respect to its solubility in the binary mixtures, this copolymer differs from polyacrylonitrile itself, which can only be dissolved and retained in solution in these binary mixtures at elevated temperatures approaching 100° C.

The solubility of the acrylonitrile copolymers cannot be predicted in advance because it is dependent not only on the relative proportions of the monomers in the starting mixture, but also on the particular conditions of the copolymerization, slight variations in the copolymerizing conditions having a marked influence on the solubility of the product, even when the products show the same overall average compositions on analysis. The fact that a copolymer shows, on analysis a given overall, average composition does not mean that it will dissolve in the same solvent as another copolymer which shows the same overall, average composition on analysis. This is due to various factors, some of which are obscure and have not been explained. This peculiar behaviour of the copolymers is exemplified in copolymers of acrylonitrile and isobutene produced under different copolymerizing conditions. Copolymers having the overall average composition 95 mol per cent acrylonitrile and 5 mol per cent isobutene have been produced which dissolve very readily in dimethyl formamide, for example, under the special conditions employed when dimethyl formamide is used as a solvent for acrylonitrile polymers as described in U. S. 2,404,713 or 2,404,728, whereas copolymers which also show the overall average composition 95 mol percent acrylonitrile, 5 mol per cent isobutene, but produced under other copolymerizing conditions do not dissolve at all in dimethyl formamide. Likewise it is found that copolymers of acrylonitrile and isobutene having the overall average composition 90 mol per cent acrylonitrile, 10 mol per cent isobutene may or may not be soluble in dimethyl formamide or in the binary mixtures of nitromethane and formamide depending upon the the conditions of their production.

Each monomer system involves its own special considerations, and the conditions, including monomer ratios, required to produce a copolymer having any desired solubility characteristics must be worked out for that particular monomer system.

I have found that the acrylonitrile-isobutene copolymer containing 10±0.5 mol per cent of isobutene in the molecule, and which is completely soluble in the binary mixtures described herein at room temperature, can be obtained by copolymerizing, in emulsion, a mixture of monomers comprising 12 parts by weight of acrylonitrile to 37 parts by weight of isobutene under the conditions set forth in the following example. In the copolymer, the relationship of the components is reversed and the acrylonitrile predominates, being present in the molecule in a proportion of 90±0.5 mol per cent.

The following example, in which all parts are by weight, will illustrate the method by which the copolymer is obtained:

Example

A charge consisting of 12 parts of acrylonitrile and 37 parts of isobutene, 100 parts of water, 2.3 parts of oleic acid, and 0.3 part of sodium hydroxide (to form the emulsifying agent sodium oleate in stoichiometric proportion) and, as polymerization catalyst, 0.33 part of potassium persulfate, was subjected to polymerizing conditions under pressure, to maintain the isobutene in the liquid condition. The mass was vigorously agitated. After 60 hours at 50° C., the copolymerization was complete and the product had the appearance of a thick, soap-like emulsion. It was poured into 50-50 aqueous isopropyl alcohol containing a small quantity of glacial acetic acid which broke and coagulated the emulsion and precipitated the copolymer in granular form. The granular product was separated by filtration, washed twice with isopropyl alcohol, then twice with ether and dried in a vacuum desiccator. The dry powdery copolymer analyzed as follows: Carbon=68.4%, hydrogen=6.35%, nitrogen= 23.7%, ash=0.

The copolymer was found to be readily and completely soluble at room temperature in binary mixtures consisting of nitromethane with formamide, in which mixtures the nitromethane is present in an amount of from 20-90 volume per cent, based on the total volume of the mixture. The copolymer is not swollen at ordinary temperatures by the binary mixtures mentioned, and shows no tendency to coalesce or "ball up" when dispersed in particulate form in the mixtures at room temperature. The copolymer remains in solution, in concentrations of 1-15% indefinitely, at room temperature, with no tendency to gel. The solution can be stored under ordinary conditions without change. Unlike dimethyl formamide, which is an expensive solvent, difficult to obtain, both nitromethane and formamide are comparatively inexpensive solvents which are available in bulk on the market. The advantages of being able to obtain clear, homogeneous solutions of the acrylonitrile polymer in the inexpensive and available solvents, which solutions do not reveal gel particles on microscopic examination even after several days storage at room temperature, by merely stirring it in the binary mixture at room temperature, without any substantial sacrifice of physical properties in the product as compared to polyacrylonitrile are apparent.

The copolymer of acrylonitrile and isobutene containing 10±0.5% isobutene in the molecule has the advantage that it has properties very similar to those of polyacrylonitrile and does not contain chemical groups which are undesirable in a product intended for textile purposes.

When an 8% solution of the copolymer is made by stirring the copolymer into a binary mixture consisting of 80 volume per cent of nitromethane and 20 volume per cent formamide at room temperature, and the solution is extruded through a spinnaret having 40 orifices of a size 3 or 4 mils each, into ethylene glycol at about 70° C., to form threads, the threads are collected on a wind-up device under conditions such that they are stretched about 325%, washed with boiling water, dried at 50° C. for about 12 hours, and then stretched 150% while being passed through a tube heated to 190° C., the final threads have a dry tensile strength of 3.5-5.0 grams per denier, and an extensibility of 15-30% in the dry state, which are the same as the strengths and extensibilities of a thread of polyacrylonitrile of the same total denier obtained by extruding an 8% dimethylformamide solution of the homopolymer into a similar bath heated to the same temperature, i. e. 70° C., and thereafter handling the thread in the manner described.

Surprisingly, the safe ironing temperature for fabrics comprising yarns of the special copolymer containing 90±0.5 mol per cent acrylonitrile in the molecule approximates the safe ironing temperature for fabrics comprising yarns of the homopolymer. While the tenacity, extensibility, and safe ironing temperature of the copolymer approximates those properties of the homopolymer, certain properties of the copolymer are better than the corresponding properties of the homopolymer. For instance, improvement is particularly noticeable in the case of dyeing properties. It is well known that polyacrylonitrile presents troublesome dyeing problems and that the known dyestuffs do not produce fast, deep dyeings on the polymer. The nitromethane-formamide soluble copolymer containing 90±0.5 mol per cent acrylonitrile in the molecule, on the other hand, can be dyed much more easily. The copolymer can be dyed to deep shades, using the known cellulose acetate "Dispersol" type dyestuffs, and the dyeings are acceptable. The cellulose acetate type dyestuffs do not produce dyeings of satisfactory depth on polyacrylonitrile yarns or fabrics. The cellulose acetate type dyestuffs merely tint yarns and fabrics of the homopolymer.

I claim:

1. Method for the production of a copolymer of acrylonitrile and isobutene containing, in the copolymer molecule, from 89.5 to 90.5 mol per cent of acrylonitrile and from 9.5 to 10.5 mol per cent isobutene, which comprises copolymerizing 12 parts by weight of acrylonitrile and 37 parts by weight of isobutene, under pressure, with stirring, in an aqueous medium containing an emulsifying agent consisting of sodium oleate and potassium persulfate as polymerization catalyst, the copolymerizing time being 60 hours and the temperature of copolymerization being 50° C.

2. A copolymer of acrylonitrile and isobutene containing, in the copolymer molecule, from 89.5 to 90.5 mol per cent acrylonitrile and from 9.5 to 10.5 mol per cent isobutene said copolymer being produced by the method of claim 1.

3. As a new article of manufacture, a fiber comprising the copolymer of claim 2, said fiber showing orientation of the molecules along the fiber axis.

MARION R. LYTTON.

REFERENCES CITED

The following references are of record in the file of this patent:

FOREIGN PATENTS

| Number | Country | Date |
|---|---|---|
| 573,086 | Great Britain | Nov. 6, 1945 |